(12) United States Patent
Zimmer et al.

(10) Patent No.: US 7,779,305 B2
(45) Date of Patent: Aug. 17, 2010

(54) METHOD AND SYSTEM FOR RECOVERY FROM AN ERROR IN A COMPUTING DEVICE BY TRANSFERRING CONTROL FROM A VIRTUAL MACHINE MONITOR TO SEPARATE FIRMWARE INSTRUCTIONS

(75) Inventors: Vincent J. Zimmer, Federal Way, WA (US); Michael A. Rothman, Puyallup, WA (US); David Dorwin, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 11/966,132

(22) Filed: Dec. 28, 2007

(65) Prior Publication Data

US 2009/0172471 A1 Jul. 2, 2009

(51) Int. Cl.
  *G06F 11/00* (2006.01)
  *G06F 11/07* (2006.01)

(52) U.S. Cl. .............................. 714/38; 714/9; 714/37; 714/40

(58) Field of Classification Search .................... 714/9, 714/15, 16, 25, 37, 38, 40, 49
See application file for complete search history.

(56) References Cited

U.S. PATENT DOCUMENTS

| | | |
|---|---|---|
| 5,918,048 A | 6/1999 | Mealey et al. |
| 5,944,821 A | 8/1999 | Angelo |
| 5,974,547 A | 10/1999 | Klimenko |
| 5,991,822 A | 11/1999 | Mealey et al. |
| 6,128,732 A | 10/2000 | Chaiken |
| 6,219,828 B1 | 4/2001 | Lee |
| 6,253,320 B1 | 6/2001 | Sekiguchi et al. |
| 6,615,288 B1 | 9/2003 | Herzi |
| 6,745,296 B2 | 6/2004 | Chong |
| 6,775,734 B2 | 8/2004 | Chang |
| 6,836,855 B2* | 12/2004 | Arndt .............................. 714/9 |
| 6,857,041 B2 | 2/2005 | LeClerg |
| 6,889,340 B1 | 5/2005 | Bramley, Jr. |
| 6,920,587 B2* | 7/2005 | Dawkins et al. ................ 714/48 |
| 6,996,748 B2* | 2/2006 | Uhlig et al. .................... 714/38 |
| 7,124,327 B2* | 10/2006 | Bennett et al. ................. 714/38 |
| 7,127,579 B2* | 10/2006 | Zimmer et al. .............. 711/163 |
| 7,231,512 B2 | 6/2007 | Rothman et al. |
| 7,269,768 B2* | 9/2007 | Rothman et al. ............. 714/723 |
| 7,308,610 B2* | 12/2007 | Kuramkote et al. ........... 714/38 |
| 7,370,324 B2* | 5/2008 | Goud et al. ..................... 718/1 |
| 7,376,821 B2* | 5/2008 | Stephan et al. ................. 713/1 |
| 7,383,471 B2* | 6/2008 | Dall ............................ 714/38 |
| 2001/0016892 A1 | 8/2001 | Klein |
| 2003/0093579 A1 | 5/2003 | Zimmer et al. |
| 2003/0200482 A1* | 10/2003 | Sullivan ....................... 714/25 |
| 2004/0034764 A1 | 2/2004 | Bulusu et al. |
| 2006/0184771 A1* | 8/2006 | Floyd et al. .................. 712/218 |
| 2007/0061634 A1* | 3/2007 | Marisetty et al. .............. 714/48 |

* cited by examiner

*Primary Examiner*—Scott T Baderman
*Assistant Examiner*—Joseph Schell
(74) *Attorney, Agent, or Firm*—Barnes & Thornburg, LLP; Glen Kellett

(57) ABSTRACT

A method and system for supporting recovery of a computing device includes determining and storing a sub-set of firmware instructions used to establish a pre-boot environment and executing the sub-set of firmware instructions in response to an error.

20 Claims, 4 Drawing Sheets

METHOD AND SYSTEM FOR RECOVERY FROM AN ERROR IN A COMPUTING DEVICE BY TRANSFERRING CONTROL FROM A VIRTUAL MACHINE MONITOR TO SEPARATE FIRMWARE INSTRUCTIONS

BACKGROUND

Virtual machine monitors (VMMs) are software virtualized platforms that allow multiple guest operating systems and/or other applications to run concurrently on the same host computing device. Some virtual machine monitors are designed to be executed over an operating system, are robust, and include many features. Such virtual machine monitors are commonly known as type-2 virtual machine monitors. Other virtual machine monitors are designed to be executed directly on the hardware platform of the computing device and include few features such as diagnostic capabilities. Such virtual machine monitors are commonly known as type-1 virtual machine monitors or hypervisors. Because hypervisors are typically designed to be "thin" and include few features, the hypervisors do not typically include error recovery code. As such, should the typical hypervisor encounter a software error, the hypervisor is unable to handle and/or recover from such an error.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
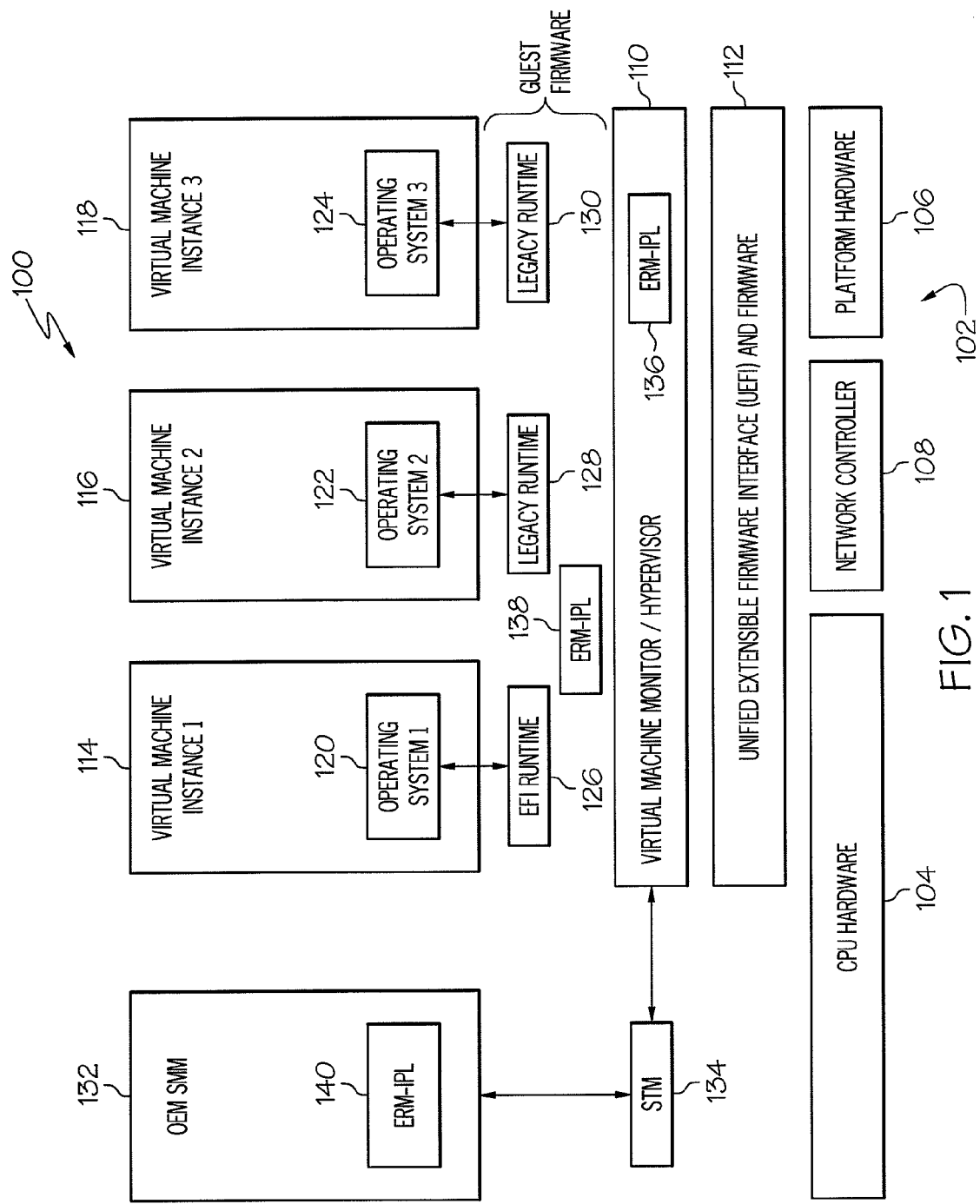
FIG. 1 is a simplified block diagram of a virtualized environment established on a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in one embodiment, a virtualized environment 100 is established on a computing device 102. The computing device 102 includes central processing unit hardware 104, platform hardware 106, and a network controller 108. Each of the central processing unit hardware 104, platform hardware 106, and a network controller 108 includes a number of additional devices or structures. For example, the central processing unit hardware 104 may include a plurality of processors, each having a plurality of processor cores. Additionally, the platform hardware 106 may include a chipset having a memory controller hub, an input/output controller hub, and system memory. As such, it should be appreciated that the computing device 102 may include a number of additional structures and devices, which are not shown in FIG. 1 for clarity of the description.

The illustrative virtualized environment 100 includes a type-1 virtual machine monitor or hypervisor 110, which is executed on a unified extensible firmware interface (UEFI) 112. The unified extensible firmware interface 112 provides a software interface between the hypervisor 110 and the platform firmware of the computing device 102. For example, the unified extensible firmware interface 112 may include data tables that contain platform information. Additionally, the unified extensible firmware interface 112 may include, or otherwise have access to, a set of software drivers, which are used by the unified extensible firmware interface 112 to establish a pre-boot environment.

A number of virtual machines may be executed on the hypervisor 110. For example, in the embodiment illustrated in FIG. 1, a virtual machine 114, a virtual machine 116, and a virtual machine 118 are each contemporaneously executed on the hypervisor 110. Each of the virtual machine instances 114, 116, 118 may execute an operating system 120, 122, 124, respectively. The operating systems 120, 122, 124 may be similar or different operating systems. For example, the operating system 120 may be a WINDOWS operating system, which is commercially available from Microsoft Corporation of Redmond, Wash., and the operating system 122 may be a LINUX operating system, which is commercially available from one of a number of vendors such as Red Hat of Raleigh, N.C. Each of the operating systems 120, 122, 124 utilize a guest firmware instance based on the particular virtual machine. For example, as illustrated in FIG. 1, the operating system 120 utilizes an extensible firmware interface runtime guest firmware instance. The operating systems 122, 124 utilize legacy runtime guest firmware instances. The operations of the guest firmware instances are translated by the hypervisor 110 such that a level of abstraction is defined between the operating systems 120, 122, 124 and the actual platform of the computing device 102.

The virtual environment 100 also includes an original equipment manufacturer (OEM) system management mode (SMM) instance 132. System management mode is a special-purpose operating mode used by some processors to handle system-wide functions such as, for example, power management, system hardware control, or proprietary original equipment manufacturer designed code. System management mode may be entered via generation of a management interrupt event such as system management interrupt (SMI) or a platform management interrupt (PMI) depending upon the particular processor architecture. The system management mode instance 132 communicates with the hypervisor 110 via a SMI Transfer Monitor (STM) 134.

During use, as discussed in more detail below in regard to FIG. 2, the extensible firmware interface firmware instructions 112 is executed to establish a pre-boot environment. The pre-boot environment may include a number of boot services for initializing the computing system 102 such as boot services for initializing system memory, detecting installed devices, configuring network communication, displaying status data on a display device, accessing a hard drive, etc. After the hypervisor and/or operating system is booted (i.e., after a boot environment is established), some of the firmware instructions 112 may be removed or otherwise inaccessible. As such, a sub-set of the firmware instructions 112 capable of reconstituting the pre-boot environment, thereby providing multiple boot services, is determined and stored in a reserved memory location. Upon the occurrence of an error, the hypervisor may be configured to execute an error handler to transfer control from the hypervisor to the sub-set of the firmware instructions 112. Execution of the sub-set of firmware instructions 112 provides multiple boot services, as described above, which may be used to recover from an error.

Figure 2:
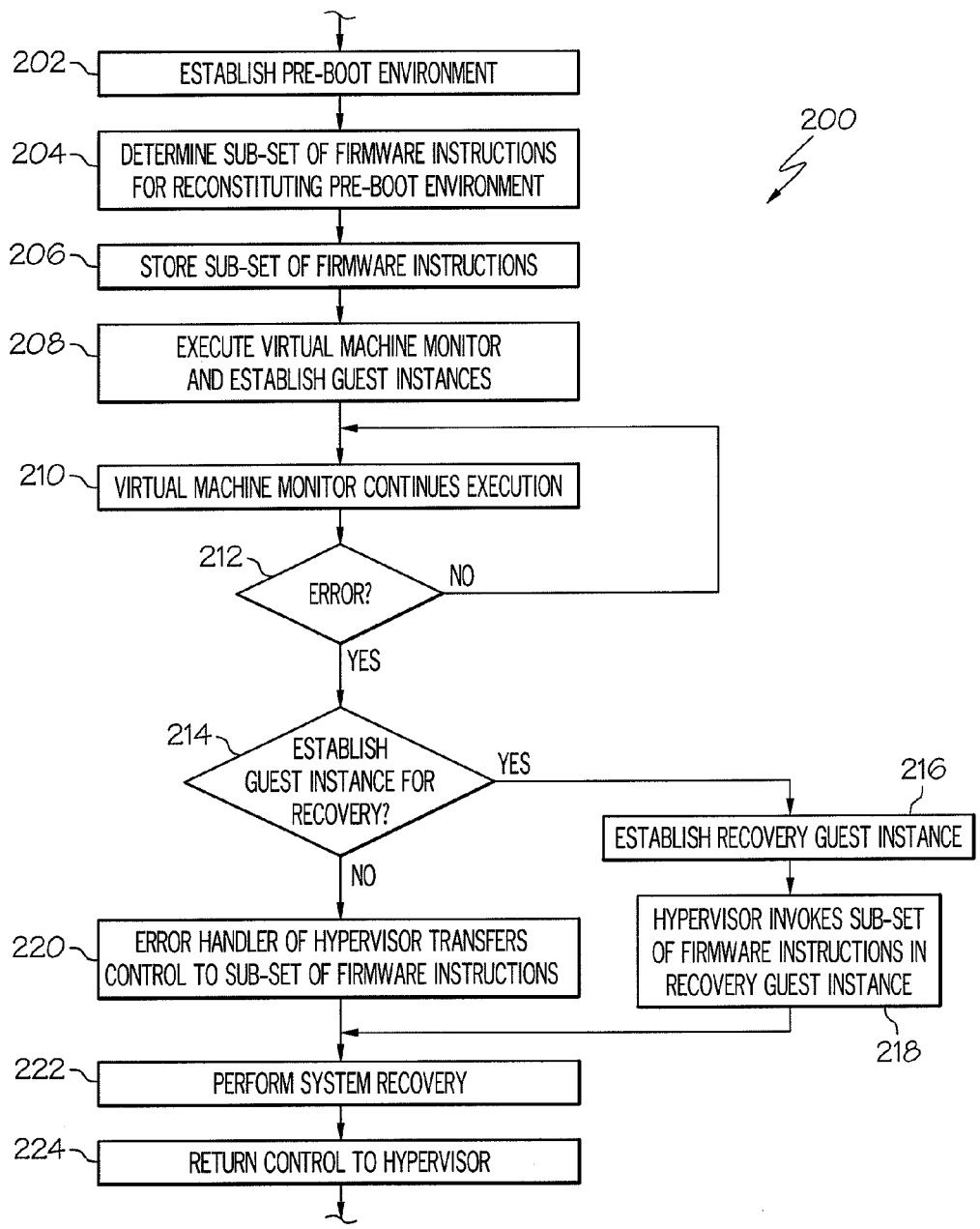
FIG. 2 is a simplified flowchart of an algorithm for recovering from an error using a hypervisor.
Figure 3:
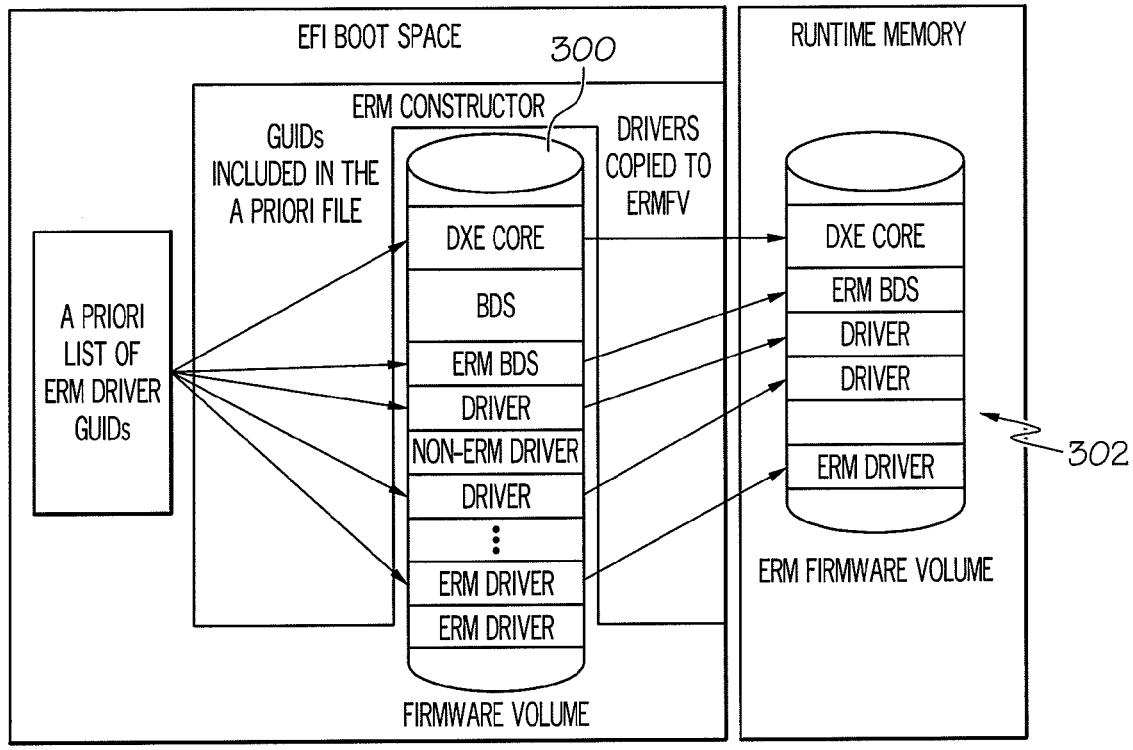
FIG. 3 is a simplified diagram of one embodiment of a sub-list of drivers used in the recovery process of the algorithm of FIG. 2.

Referring now to FIG. 2, an algorithm 200 for supporting recovery of a computing device includes block 202 in which a pre-boot environment is established. As described above, the pre-boot environment is established by execution of the unified extensible firmware interface firmware instructions 112. The firmware instructions 112 executed to establish the pre-boot environment may include multiple drivers for input/out devices, memory devices, and/or storage devices. For example, as illustrated in FIG. 3, in one embodiment, the firmware instructions 112 include a set of pre-boot drivers 300. The illustrative pre-boot drivers 300 include Driver Execution Environment (DXE) core drivers, Boot Device Selection (BDS) drivers, emergency runtime monitor boot device selection drivers, and/or other drivers or instructions. As such, a plurality of boot services are made available in the pre-boot environment, some of which may be off-loaded or otherwise unavailable after booting of the hypervisor and/or operating system.

In block 204, a sub-set of the firmware instructions 112 for reconstituting the pre-boot environment is determined. The particular drivers selected from the pre-boot drivers 300 for use during recovery may be based on a number of different criteria such as the hardware architecture of the computing device 102, the intended use of the computing device 102, security considerations, fault tolerance, and other criteria. As illustrated in FIG. 3, a set of emergency runtime monitor drivers 302 (i.e., a sub-set of the firmware instructions 112 used to establish the pre-boot environment) is generated. The drivers 302 may be executed to reconstitute the pre-boot environment and provide access to multiple boot services as discussed above.

In block 206, the determined sub-set of firmware instructions 112 for reconstituting the pre-boot environment are stored in a reserved memory location. As such, the location of the sub-set of firmware instructions 112 may be passed to the hypervisor 110. In block 208, the virtual machine monitor (e.g., a hypervisor) is executed and any required guest instances or virtual machines are established. The location of the stored sub-set of firmware instructions 112 is passed to the hypervisor 110. In some embodiments, the hypervisor 110 may include an error handler configured to execute the sub-set of firmware instructions in response to the generation of an error as discussed below. The virtual machine monitor continues execution in block 210.

In block 210, the computing device 102 determines if an error has occurred. If not, the algorithm 200 loops back to block 210 in which the virtual machine monitor 110 continues execution. However, if an error has occurred, it is determined whether a guest instance for recovery should be established in block 214. If so, the guest instance is established in block 216 and the hypervisor invokes the sub-set of firmware instructions in the recovery guest instance in block 218. As such, the sub-set of firmware instructions are executed in the guest instance, which increases the security of the computing device 102, to re-establish or reconstitute the pre-boot environment and provide one of a number of boot services.

Alternatively, referring back to block 214, if a guest instance for recovery is not to be established, the error handler of the hypervisor 110 transfers control to the sub-set of firmware instructions in block 220. In response, the sub-set of firmware instructions are executed to reconstitute the pre-boot environment and any one of a number of boot services may be invoked to recover the system in block 222. After the system has recovered, control is returned to the hypervisor in block 224. In some embodiments, the state of the hypervisor is stored prior to execution of the sub-set of the firmware instructions. In such embodiments, the state of the hypervisor may be restored in block 224.

Figure 4:
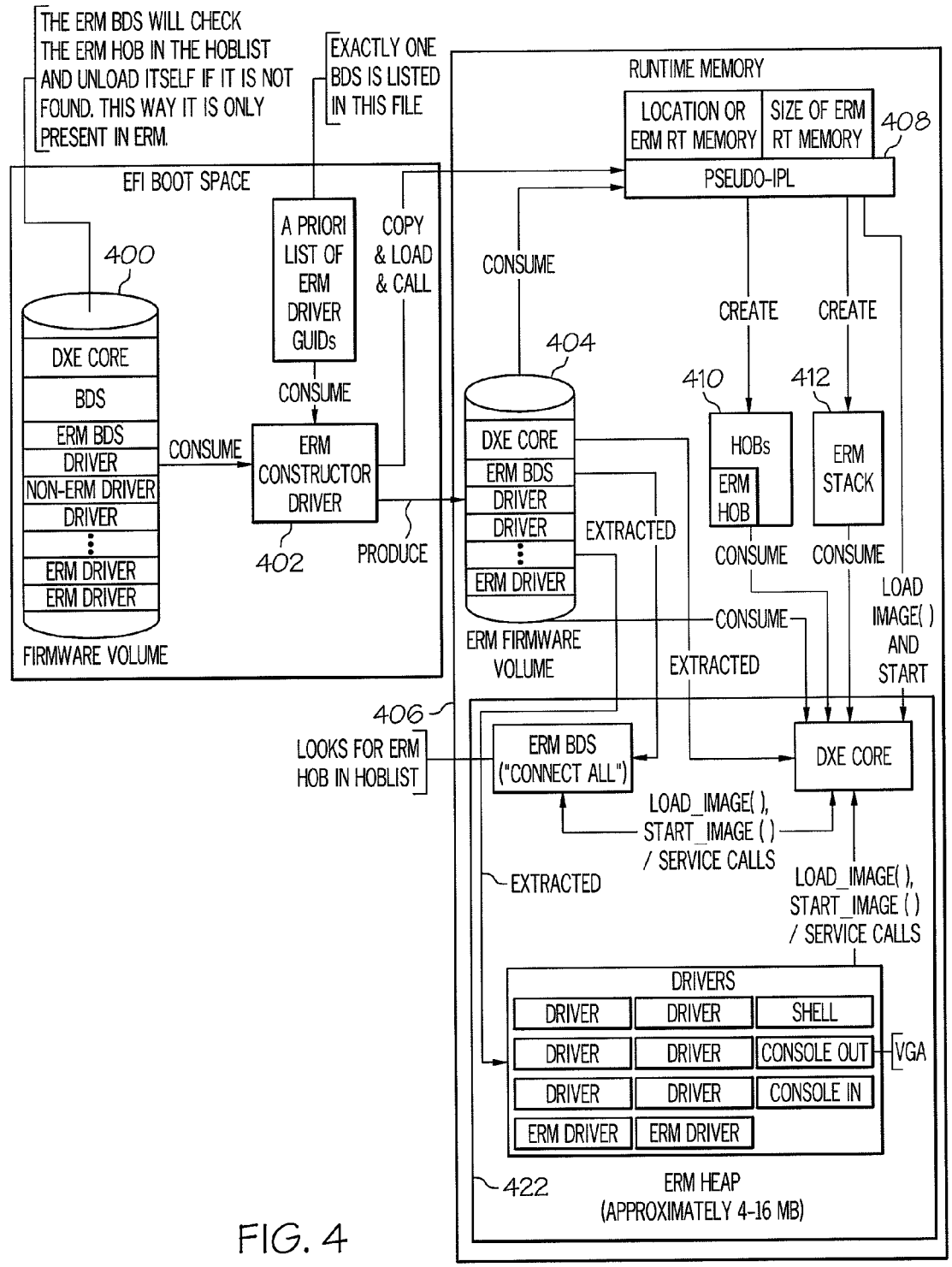
FIG. 4 is a simplified operation diagram of a recovery process of the algorithm of FIG. 2.

Referring to FIG. 4, one embodiment of the reconstitution of the pre-boot environment is illustrated. As discussed above, a set of pre-boot extensible firmware interface drivers 400 are executed to establish a pre-boot environment and provide multiple boot services. An emergency constructor driver 402 generates an emergency runtime monitor driver set 404 (i.e., a sub-set of the pre-boot extensible firmware interface drivers 400) in a runtime memory space 406.

Figure 5:
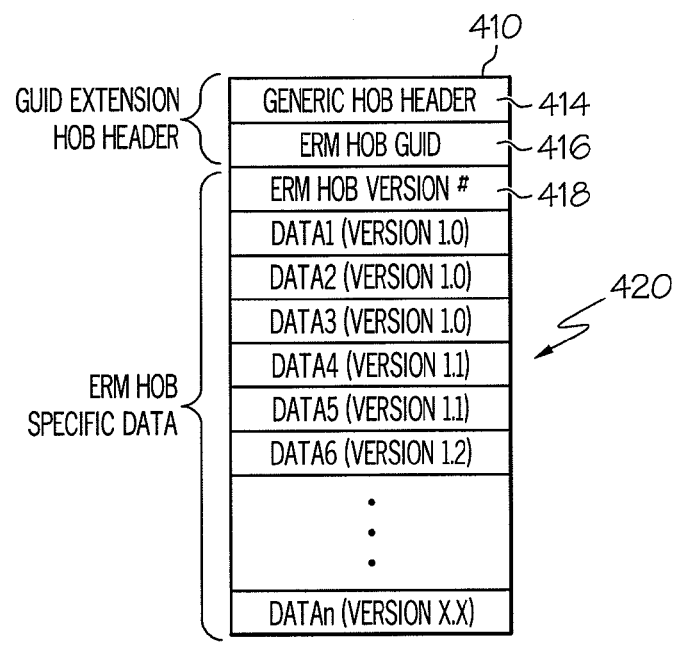
FIG. 5 is a simplified diagram of one embodiment of a hand off block that may be generated during the execution of the algorithm of FIG. 2.

If an error occurs, an emergency runtime monitor error handler or initial program loader (IPL) 408 is executed and creates a hand off block (HOB) 410 and emergency runtime monitor stack 412. One illustrative embodiment of a hand off block 408 that may be generated by the initial program loader 408 is illustrated in FIG. 5 The hand off block 410 includes a generic hand off block header 414, an emergency runtime monitor (ERM) hand off block (HOB) globally unique identifier (GUID) 416, an emergency runtime monitor (ERM) version number 418, and a plurality of data 420

Referring back to FIG. 4, the individual drivers of the emergency runtime monitor driver set 404 are extracted into an emergency runtime monitor memory space 422 in response to an occurrence of an error. As discussed above, the unified extensible firmware interface drivers are re-usable in the runtime environment, which supports recovery and continued processing of the guest operating systems and applications being executed in the virtual machine monitors 114, 116, 118. Again, the particular type of driver sequestered by the unified extensible firmware interface and allocated to the emergency runtime environment driver set 404 may be selected based on one or more of a number of criteria such as, for example, the hardware architecture of the computing device 102, the intended use of the computing device 102, security considerations, fault tolerance, and other criteria.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising:
    executing firmware instructions to establish a pre-boot environment on a computing device;
    determining a sub-set of the firmware instructions that provide pre-boot environment services;
    storing the sub-set of the firmware instructions in a reserved memory location;
    executing a virtual machine monitor; and
    transferring control from the virtual machine monitor to the sub-set of firmware instructions in response to an error.

2. The method of claim 1, wherein the virtual machine monitor is a hypervisor.

3. The method of claim 1, wherein the error comprises at least one of a system management interrupt and a platform management interrupt.

4. The method of claim 1, wherein the sub-set of firmware instructions comprise extensible firmware interface instructions.

5. The method of claim 1, wherein the sub-set of firmware instructions includes at least one driver execution environment (DXE) driver.

6. The method of claim 1, further comprising generating a guest instances, wherein transferring control from the virtual machine monitor to the sub-set of firmware instruction comprises invoking the sub-set of firmware instructions in the guest instance in response to the error.

7. The method of claim 1, further comprising:
    generating a virtual machine; and
    executing an operating system in the virtual machine, wherein the error comprises an error of the operating system.

8. The method of claim 7, further comprising:
    storing a state of the operating system in response to the error, and
    restoring the state of the operating system subsequent to execution of the sub-set of firmware instructions.

9. The method of claim 1, further comprising:
    storing a state of the virtual machine monitor in response to the error, and
    restoring the state of the virtual machine monitor subsequent to execution of the sub-set of firmware instructions.

10. The method of claim 1, wherein executing a virtual machine monitor comprises executing a virtual machine monitor having an error handler configured to execute the sub-set of firmware instructions in response to the error.

11. A machine readable storage medium comprising a plurality of instructions, that in response to being executed, result in a computing device
    creating a sub-set of firmware instructions from a set of firmware instructions used to establish a pre-boot environment; and
    executing an error handler of a virtual machine monitor to cause execution of the sub-set of firmware instructions to reconstitute the pre-boot environment in response to an error.

12. The machine readable medium of claim 11, wherein executing an error handler of a virtual machine monitor comprises executing an error handler of a hypervisor to cause execution of the sub-set of firmware instructions to reconstitute the pre-boot environment in response to the error.

13. The machine readable medium of claim 11, wherein the error comprises at least one of a system management interrupt and a platform management interrupt.

14. The machine readable medium of claim 11, wherein the sub-set of firmware instructions comprise extensible firmware interface instructions.

15. A computing device comprising:
    a processor, and
    a memory device having stored therein a plurality of instructions that when executed by the processor cause the processor to
    execute firmware instructions to establish a pre-boot environment on a computing device;
    determine a sub-set of the firmware instructions that provide pre-boot environment services;
    store the sub-set of the firmware instructions in a reserved memory location;
    execute a hypervisor; and
    transfer control from the hypervisor to the sub-set of firmware instructions in response to an error.

16. The device of claim 15, wherein to transfer control from the hypervisor to the sub-set of firmware instructions comprises establishing a guest instance and invoking the sub-set of the firmware instructions in the guest instance.

17. The device of claim 15, wherein the error comprises at least one of a system management interrupt and a platform management interrupt.

18. The device of claim 15, wherein the sub-set of firmware instructions comprise extensible firmware interface instructions.

19. The device of claim 15, wherein the sub-set of firmware instructions includes at least one driver execution environment (DXE) driver.

20. The device of claim 15, wherein the plurality of memory instructions further cause the processor to:
    store a state of the hypervisor in response to the error, and
    restore the state of the hypervisor subsequent to execution of the sub-set of firmware instructions.

* * * * *